US009083760B1

(12) United States Patent
Hughes et al.

(10) Patent No.: US 9,083,760 B1
(45) Date of Patent: Jul. 14, 2015

(54) DYNAMIC CLONING AND RESERVATION OF DETACHED IDLE CONNECTIONS

(75) Inventors: John R. Hughes, Seattle, WA (US); Eric Hammerle, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 96 days.

(21) Appl. No.: 13/206,474

(22) Filed: Aug. 9, 2011

Related U.S. Application Data

(60) Provisional application No. 61/371,880, filed on Aug. 9, 2010.

(51) Int. Cl.
*G06F 15/173* (2006.01)
*H04L 29/08* (2006.01)

(52) U.S. Cl.
CPC .................................. *H04L 67/2842* (2013.01)

(58) Field of Classification Search
CPC .. H04L 67/2842; H04L 45/00; H04L 49/3009
USPC .................................................. 709/223, 238
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,299,312 | A | 3/1994 | Rocco, Jr. |
| 5,327,529 | A | 7/1994 | Fults et al. |
| 5,367,635 | A | 11/1994 | Bauer et al. |
| 5,371,852 | A | 12/1994 | Attanasio et al. |
| 5,406,502 | A | 4/1995 | Haramaty et al. |
| 5,475,857 | A | 12/1995 | Dally |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

MacVittie, Lori, "Message-Based Load Balancing," Technical Brief, Jan. 2010, pp. 1-9, F5 Networks, Inc.

(Continued)

*Primary Examiner* — Phuoc Nguyen
(74) *Attorney, Agent, or Firm* — LeClairRyan, a Professional Corporation

(57) ABSTRACT

A system and method for optimizing use of idle server connections comprises receiving, at a first network traffic management device of a cluster, a request from a client device to access a server. The first network traffic management device reserve an idle flow connection from an idle connection pool previously established between at least a second network traffic management device and the server. A flow cookie is retrieved from the second network traffic management device. The flow cookie comprises routing information associated with the retrieved idle flow connection, whereby the flow cookie is modified to represent the connection between the server and the first network traffic management device. The updated flow cookie is incorporated into the received request and forwarded to the server, wherein a server response contains the updated flow cookie such that the response is received by the first network traffic management device.

21 Claims, 4 Drawing Sheets

(56) References Cited

U.S. PATENT DOCUMENTS

| | | | |
|---|---|---|---|
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Jordan et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 * | 10/2007 | O'Toole, Jr. ................. 709/228 |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,668,166 B1 | 2/2010 | Rekhter et al. |
| 7,724,657 B2 | 5/2010 | Rao et al. |
| 7,801,978 B1 * | 9/2010 | Susai et al. .................... 709/224 |
| 7,908,314 B2 | 3/2011 | Yamaguchi et al. |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,380,854 B2 | 2/2013 | Szabo |
| 8,447,871 B1 | 5/2013 | Szabo |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0003287 A1 | 1/2004 | Zissimopoulos et al. |
| 2004/0103283 A1 | 5/2004 | Hornak |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |

(56) References Cited

U.S. PATENT DOCUMENTS

| | | | |
|---|---|---|---|
| 2006/0171365 | A1 | 8/2006 | Borella |
| 2006/0233106 | A1 | 10/2006 | Achlioptas et al. |
| 2006/0242300 | A1 | 10/2006 | Yumoto et al. |
| 2007/0016662 | A1 | 1/2007 | Desai et al. |
| 2007/0064661 | A1 | 3/2007 | Sood et al. |
| 2007/0083646 | A1 | 4/2007 | Miller et al. |
| 2007/0107048 | A1 | 5/2007 | Halls et al. |
| 2007/0118879 | A1 | 5/2007 | Yeun |
| 2007/0174491 | A1 | 7/2007 | Still et al. |
| 2007/0220598 | A1 | 9/2007 | Salowey et al. |
| 2007/0297551 | A1 | 12/2007 | Choi |
| 2008/0034136 | A1 | 2/2008 | Ulenas |
| 2008/0072303 | A1 | 3/2008 | Syed |
| 2008/0133518 | A1 | 6/2008 | Kapoor et al. |
| 2008/0134311 | A1 | 6/2008 | Medvinsky et al. |
| 2008/0148340 | A1 | 6/2008 | Powell et al. |
| 2008/0201599 | A1 | 8/2008 | Ferraiolo et al. |
| 2008/0256224 | A1 | 10/2008 | Kaji et al. |
| 2008/0301760 | A1 | 12/2008 | Lim |
| 2009/0028337 | A1 | 1/2009 | Balabine et al. |
| 2009/0049230 | A1 | 2/2009 | Pandya |
| 2009/0119504 | A1 | 5/2009 | van Os et al. |
| 2009/0125625 | A1 | 5/2009 | Shim et al. |
| 2009/0138749 | A1 | 5/2009 | Moll et al. |
| 2009/0141891 | A1 | 6/2009 | Boyen et al. |
| 2009/0228956 | A1 | 9/2009 | He et al. |
| 2009/0287935 | A1 | 11/2009 | Aull et al. |
| 2010/0023582 | A1* | 1/2010 | Pedersen et al. ............. 709/203 |
| 2010/0071048 | A1 | 3/2010 | Novak et al. |
| 2010/0122091 | A1 | 5/2010 | Huang et al. |
| 2010/0150154 | A1 | 6/2010 | Viger et al. |
| 2010/0242092 | A1 | 9/2010 | Harris et al. |
| 2010/0251330 | A1 | 9/2010 | Kroeselberg et al. |
| 2010/0325277 | A1 | 12/2010 | Muthiah et al. |
| 2011/0040889 | A1 | 2/2011 | Garrett et al. |
| 2011/0047620 | A1 | 2/2011 | Mahaffey et al. |
| 2011/0066718 | A1* | 3/2011 | Susai et al. .................... 709/224 |
| 2011/0173295 | A1 | 7/2011 | Bakke et al. |
| 2011/0273984 | A1 | 11/2011 | Hsu et al. |
| 2011/0282997 | A1 | 11/2011 | Prince et al. |
| 2011/0321122 | A1 | 12/2011 | Mwangi et al. |
| 2012/0066489 | A1 | 3/2012 | Ozaki et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Crescendo Networks, "Application Layer Processing (ALP)," Chapter 9, CN-5000E/5500E, pp. 168-186, Foxit Software Company.

"A Process for Selective Routing of Servlet Content to Transcoding Modules," Research Disclosure 422124, Jun. 1999, pp. 889-890, IBM Corporation.

"Big-IP Controller With Exclusive OneConnect Content Switching Feature Provides a Breakthrough System for Maximizing Server and Network Performance," F5 networks, Inc,, Press Release, May 8, 2001, 2 pages.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176 The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005 PowerPoint Presentation, slides 1-12, Citrix Systems, Inc.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003, 8 pages, (Updated Jul. 31, 2004), http://technet.microsoft.com/en-us/library/cc738207, Microsoft Corporation.

F5 Networks Inc., "Configuration Guide for Local Traffic Management," F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report for International Patent Application No. PCT/US2013/026615 (Jul. 4, 2013).

* cited by examiner

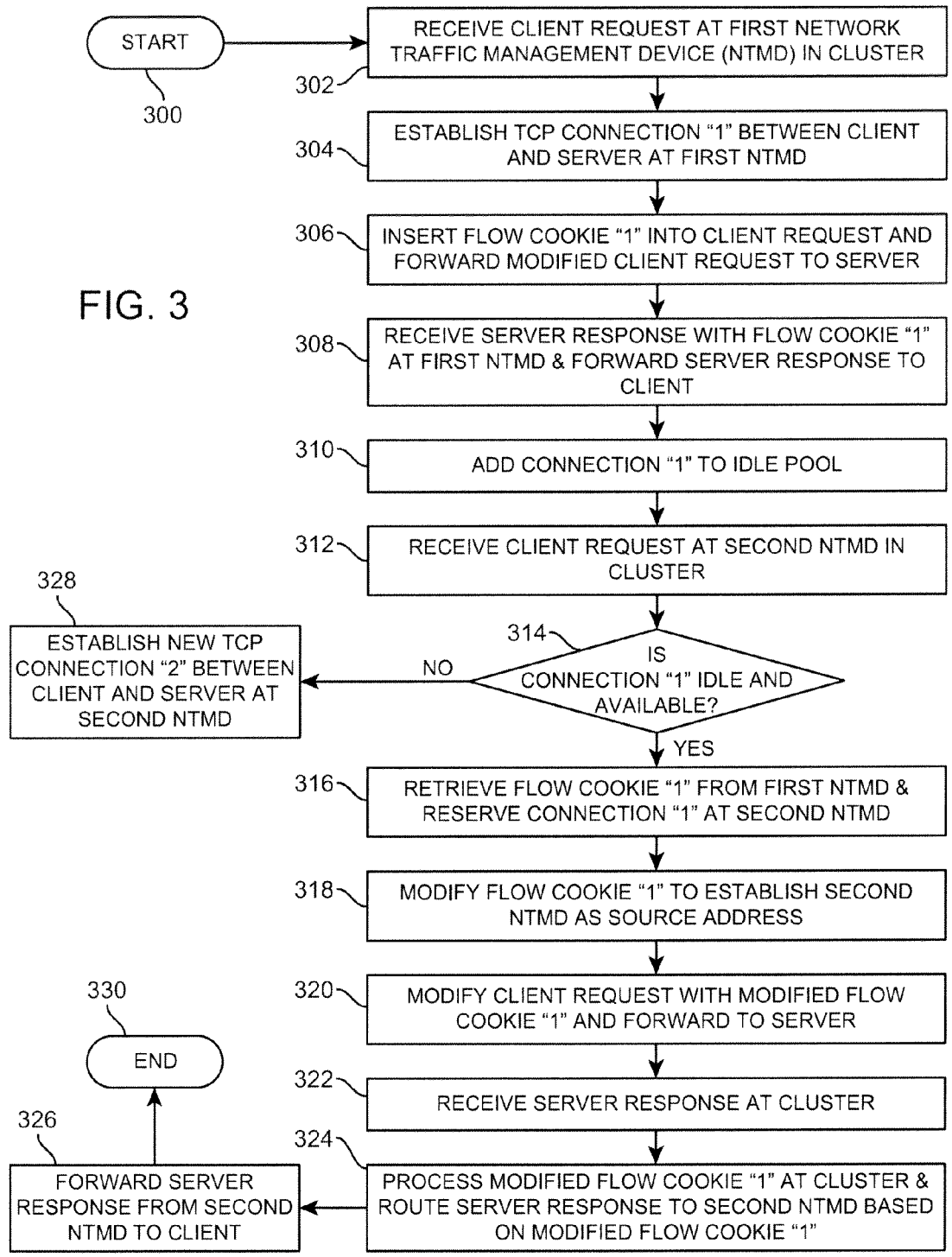

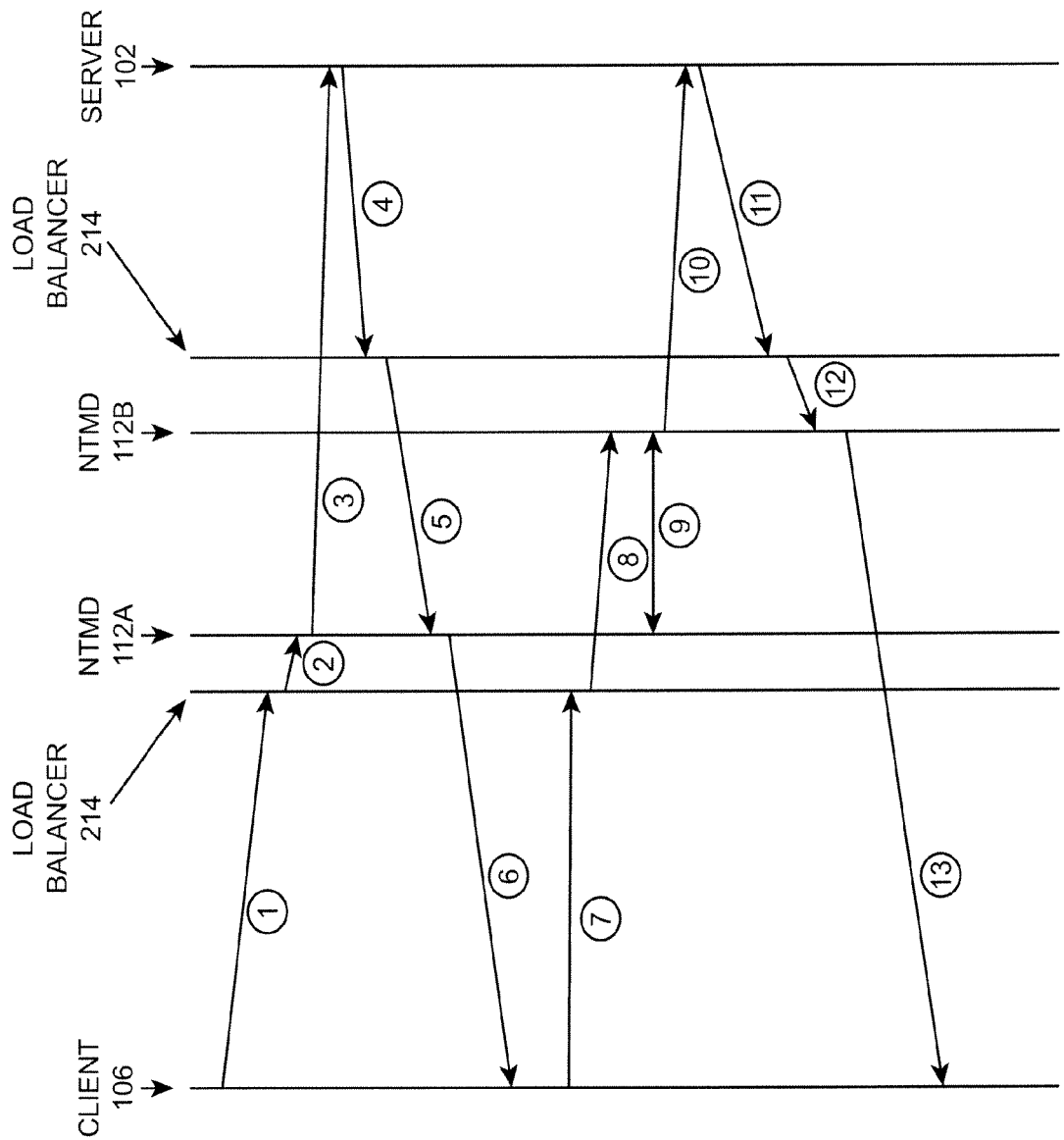

DYNAMIC CLONING AND RESERVATION OF DETACHED IDLE CONNECTIONS

STATEMENT OF RELATED APPLICATION

The present application claims the benefit of priority based on U.S. Provisional Patent Application Ser. No. 61/371,880, filed on Aug. 9, 2010, in the names of John R. Hughes and Eric J. Hammerle, entitled "Dynamic Cloning and Reservation of Detached Idle Connections", which is hereby incorporated by reference and commonly owned herewith.

FIELD

The present disclosure is directed to a system and method for dynamically cloning and reserving detached idle connections among network traffic management devices in a cluster.

BACKGROUND

In enabling Internet communications between network devices, a flow connection must be established between a requesting client device and a responding server device. In establishing a TCP flow connection, the kernel of the server operating system must allocate memory for the TCP connection state and data buffers, then notify the web server process. The web server process may have a thread ready to use, have to setup another thread, or even have to create a full copy of the main web server process. It is thus more computationally intensive to setup new connections in handling requests in comparison to an already-open connection. For each established connection, a web server consumes memory for the TCP connection itself (state/buffers stored in the kernel, likely only 8-64 KB for an idle connection depending on memory pressure and previous use). More importantly, each connection consumes web server threads, and for most web applications, several megabytes of unique per-thread memory. As concurrency goes from tens to hundreds, or possibly hundreds to thousands (depending on application), the overhead of selecting which process/thread to run, and for how long, increases dramatically, reducing the effective CPU capacity of the server (known as context-switching overhead). Fewer open connections and fewer connections opening/closing means lower resource consumption per server.

In particular, NTLM is a protocol used over HTTP to associate an authentication state with the underlying TCP connection. Once an NTLM handshake has successfully completed, the client may proceed to issue HTTP keepalive requests on the same connection without the need for re-authentication. The distribution of client connections across network traffic management devices in a cluster may result in subsequent requests from the previously authenticated client to be handled by another network traffic management device that has not been authenticated.

What is needed is a system and method for dynamically cloning and reserving detached idle connections among network traffic management devices in a cluster that overcomes these disadvantages and limitations.

SUMMARY

In an aspect, a method for optimizing use of idle server connections is described. The method comprises receiving, at a first network traffic management device, a request from a client device to access a server, wherein the first network traffic management device is of a plurality of network traffic management devices in a cluster. The method comprises reserving an idle flow connection from an idle connection pool that was previously established at least a second network traffic management device and the server. The method comprises retrieving a flow cookie from the second network traffic management device at the first network traffic management device, wherein the flow cookie comprises routing information associated with the retrieved idle flow connection. The method comprises modifying the flow cookie at the first network traffic management device such that routing information for the flow connection is updated to be between the server and the first network traffic management device. The method comprises incorporating the updated flow cookie into the received request to modify the request and forwarding the modified request to the server, wherein a response from the server contains the updated flow cookie such that the response is to be received by the first network traffic management device.

A non-transitory machine readable medium having stored thereon instructions for optimizing use of idle server connections, comprising machine executable code which when executed by at least one machine in a first network traffic management device, causes the machine to: receive a request from a client device to access a server. The first network traffic management device is of a plurality of network traffic management devices in a cluster. An idle flow connection is reserved from an idle connection pool that was previously established at least a second network traffic management device and the server. A flow cookie is retrieved from the second network traffic management device at the first network traffic management device, wherein the flow cookie comprises routing information associated with the retrieved idle flow connection. The flow cookie is modified at the first network traffic management device such that routing information for the flow connection is updated to be between the server and the first network traffic management device. The updated flow cookie is incorporated into the received request to modify the request and forwarded to the server, wherein a response from the server contains the updated flow cookie such that the response is to be received by the first network traffic management device.

A network traffic management cluster having a plurality of network traffic management devices. The cluster comprising a first network traffic management device including: a network interface configured to receive and transmit network data packets over one or more networks. The first network traffic management device includes a memory storing one or more programming instructions and a processor configured to execute the stored programming instructions, which when executed result in actions being performed that include: receiving a request from a client device to access a server; reserving an idle flow connection from an idle connection pool that was previously established at least a second network traffic management device and the server; retrieving a flow cookie from the second network traffic management device at the first network traffic management device, wherein the flow cookie comprises routing information associated with the retrieved idle flow connection; modifying the flow cookie at the first network traffic management device such that routing information for the flow connection is updated to be between the server and the first network traffic management device; incorporating the updated flow cookie into the received request to modify the request and forwarding the modified request to the server, wherein a response from the server contains the updated flow cookie such that the response is to be received by the first network traffic management device.

In one or more of the above aspects, a disaggregator module is configured to route client requests and server responses to one or more network traffic management devices in the cluster by performing a load balancing method, wherein the flow cookie is updated by changing one or more values in the retrieved flow cookie. In one or more aspects, the flow cookie is incorporated in an IPv6 header, a HTTP header, and/or a body of the request and the response. In one or more aspects, a forwarding entry is registered at the second network traffic management device, wherein the forwarding entry automatically causes packets sent to the second network traffic management device to be sent to the first network traffic management device.

BRIEF DESCRIPTION OF THE DRAWINGS

FIG. 3 is an example flow chart diagram depicting a process for dynamically cloning and reserving detached idle connections among network traffic management devices in a cluster in accordance with an aspect of the present disclosure; and FIG. 4 is an example ladder diagram depicting a process for dynamically cloning and reserving detached idle connections among network traffic management devices in a cluster in accordance with an aspect of the present disclosure.

DETAILED DESCRIPTION

In general, the present disclosure is directed to a system and method for dynamically cloning and reserving detached idle connections among network traffic management devices in a network traffic management cluster. In particular, the system and method utilizes a cloning module in the network traffic management devices to generate a flow cookie which is inserted into a client request that is forwarded to the server. The flow cookie is configured to cause the server to properly route the response back to the correct network traffic management device and client device via a server side load balancer. The present system and method allows subsequent client requests to be handled by one or more other network traffic management devices in the cluster, whereby the other network traffic management device reserves and reuses already established flow connections from an idle pool. To ensure that server responses to these subsequent requests are properly routed back to the forwarding network traffic management device, the network traffic management device retrieves the flow cookie of the previous flow connection and modifies it to identify it as the sending device.

Figure 1:
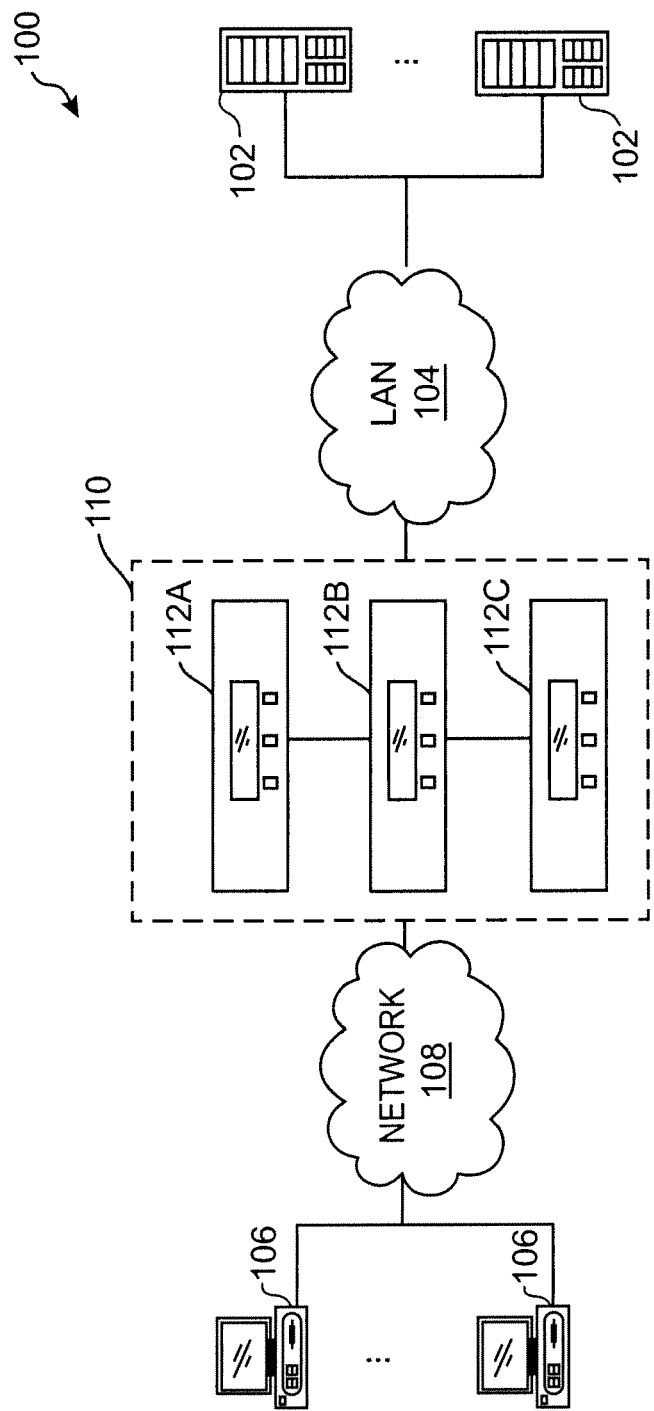
FIG. 1 illustrates a block diagram of an example environment showing a cluster of traffic management devices in accordance with an aspect of the present disclosure.

FIG. 1 illustrates a block diagram of an example environment showing a cluster of traffic management devices in accordance with an aspect of the present disclosure. The example system environment 100 includes one or more servers 102, one or more client devices 106 and one or more network traffic management clusters 110 comprising a plurality of network traffic management devices 112A-112C. It should be noted that although one network traffic management cluster 110 and three network traffic management devices 112A-112C are shown in FIG. 1, the environment 100 could include other numbers and types of devices in other arrangements.

The network traffic management devices 112A-112C of the cluster 110 is coupled to the servers 102 via local area network (LAN) 104 and client devices 106 via network 108.

Generally, requests sent over the network 108 from client devices 106 towards servers 102 are received, handled and transmitted by network traffic management devices 112A-112C of the cluster 110.

Client devices 106 comprise network computing devices capable of connecting to other computing devices, such as network traffic management devices 112A-112C of the cluster 110 and servers 102. Such connections are performed over wired and/or wireless networks, such as network 108, to send and receive data, such as for Web-based and non Web-based requests, receiving responses to requests and/or performing other tasks. Non-limiting and non-exhausting examples of such client devices include personal computers (e.g., desktops, laptops), tablets, mobile and/or smart phones and the like. In an example, client devices 106 run Web browsers that may provide an interface for operators, such as human users, to interact with for making requests for resources to different web server-based applications or Web pages via the network 108, although other server resources may be requested by clients. One or more Web-based applications may run on the server 102 that provide the requested data back to one or more exterior network devices, such as client devices 106.

The server 102 comprises one or more network computing machines capable of operating one or more Web-based and/or non Web-based applications that may be accessed by other network devices in the network 108, such as client devices 106 and network traffic management devices 112A-112C of the cluster 110. The server 102 may provide other data, such as particular Web page(s), image(s) of physical objects, and any other objects, responsive to the requests. It should be noted that the server 102 may perform other tasks and provide other types of resources. It should be noted that while only two servers 102 are shown in the environment 100 depicted in FIG. 1, other numbers and types of servers may be coupled to the network traffic management devices 112A-112C of the cluster 110. It is also contemplated that one or more of the servers 102 may be a cluster of servers managed by the network traffic management devices 112A-112C of the cluster 110. In an embodiment, Web application server 102 utilizes software to allow it run the RADIUS protocol (Remote Access Dial In User Services) to provide authentication, authorization, and accounting (AAA) services for dial-up PPP/IP and Mobile IP access. In this example, the servers 102 may be any version of Microsoft® IIS servers or Apache® servers, although other types of servers may be used. Further, additional servers may be coupled to the network 108 and many different types of applications may be available on servers coupled to the network 108.

Network 108 comprises a publicly accessible network, such as the Internet. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, servers 102 and network traffic management devices 112A-112C of the cluster 110, and the like.

LAN 104 comprises a private local area network via which one or more of the network traffic management devices 112A-112C of the cluster 110 communicate with the one or more servers 102. Networks, including local area networks, besides being understood by those skilled in the relevant arts, have already been generally described above in connection with network 108 and thus will not be described further.

As per the TCP/IP protocols, requests from the requesting client devices 106 may be sent as one or more streams of data packets over network 108 to the network traffic management devices 112A-112C of the cluster 110 and/or the servers 102. Such protocols can be used by the network devices to establish connections, send and receive data for existing connections, and the like. It is to be understood that the one or more servers 102 may be hardware and/or software, and/or may represent a system with multiple servers that may include internal or external networks.

As shown in the example environment 100 depicted in FIG. 1, the network traffic management devices 112A-112C of the cluster 110 is interposed between client devices 106 in network 108 and servers 102 in LAN 104. Again, the environment 100 could be arranged in other manners with other numbers and types of devices. Also, the network traffic management devices 112A-112C of the cluster 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Figure 2:
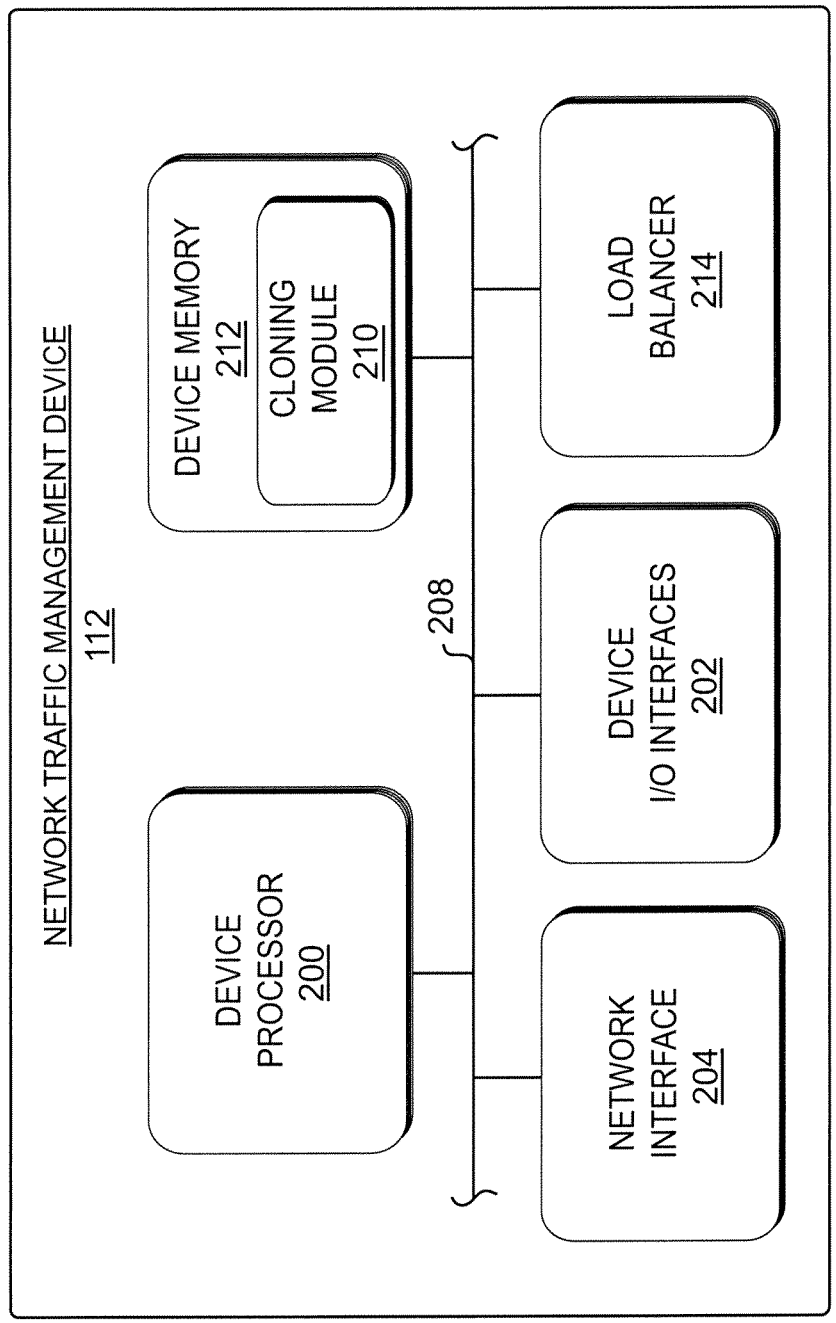
FIG. 2 illustrates a block diagram of a network traffic management device of the cluster shown in FIG. 1 in accordance with an aspect of the present disclosure.

FIG. 2 illustrates a block diagram of a network traffic management device of the cluster shown in FIG. 1 in accordance with an aspect of the present disclosure. As shown in FIG. 2, the network traffic management device 112 of a cluster includes one or more local device processors 200, one or more device I/O interfaces 202, one or more network interface 204, one or more device memories 212 and one or more load balancers 214 coupled together by bus 208. It should be noted that the network traffic management device 112 could include other types and numbers of components. In addition, as shown in FIG. 2, the network traffic management device 112 includes a software-based cloning module 210 which is stored in the memory 212, whereby the processor 200 implements the cloning module 210 to perform the processes described in FIGS. 3 and 4.

Device processor 200 comprises one or more microprocessors configured to execute computer/machine readable and executable instructions, such as the cloning module 210, stored in device memory 212. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor is programmed or configured according to the teachings as described and illustrated in the present disclosure.

Device I/O interfaces 202 comprise one or more user input and output device interface mechanisms. The interface may include a computer keyboard, touchscreen, mouse, display device, and the corresponding physical ports and underlying supporting hardware and software to enable the network traffic management device 112 with another network traffic management device 112 in the cluster as well as communicate with other network devices in the environment 100. Such communications may include accepting user data input and to provide user output, although other types and numbers of user input and output devices may be used. Additionally or alternatively, as will be described in connection with network interface 204 below, the network traffic management device 112 may communicate with the outside environment for certain types of operations (e.g., configuration) via one or more network management ports.

Network interface 204 comprises one or more mechanisms that enable the network device 106, 110 to engage in TCP/IP communications via the LAN 104 and the network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108.

In the present example, one or more network traffic management device 112 includes more than one device processor 200 (or a processor 200 has more than one core), each processor 200 (and/or core) may use the same single network interface 204 or a plurality of network interfaces 204 to communicate with other network traffic management devices 112 in the cluster 110. Further, the network interface 204 may include one or more physical ports, such as Ethernet ports, to couple the network traffic management device 112 with other network devices, such as servers 102. Moreover, the network interface 204 may include certain physical ports dedicated to receiving and/or transmitting certain types of network data, such as device management related data for configuring the network traffic management device 112.

Bus 208 may comprise one or more internal device component communication buses, links, bridges and supporting components, such as bus controllers and/or arbiters. The bus enable the various components of the network traffic management device 112, such as the processor 200, device I/O interfaces 202, network interface 204, load balancers 214 and device memory 212, to communicate with one another. However, it is contemplated that the bus may enable one or more components of the network traffic management device 112 to communicate with components in other network devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 112.

Device memory 218 comprises non-transitory computer or machine readable media, namely computer readable or processor readable storage media, which are examples of machine-readable storage media. Computer readable storage/machine-readable storage media may include volatile, non-volatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of the network traffic management device 112 to perform one or more portions of the process described herein.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as network traffic management device 112.

As mentioned above, establishing and shutting down TCP/IP connections between two network devices generally causes a lot of overhead. Instead of opening a new connection between each client 106 and server 102, one or more of the network traffic management devices 112(A)-112(C) of the cluster may maintain a pool of connections with the servers. When a client requests content, one or more of the network traffic management devices 112(A)-112(C) of the cluster may use one of its previously opened connections to relay the request to an appropriate server.

When a connection between a traffic manager and a server in a server array becomes idle, one or more of the network traffic management devices 112(A)-112(C) of the cluster may copy a subset of state information in the connection object to another object. The one or more of the network traffic management devices 112(A)-112(C) of the cluster may then free the memory associated with the connection object and allows it to be used to store other data. When the one or more of the network traffic management devices 112(A)-112(C) of the cluster needs to use an idle connection with the server again, it may then copy the state information from the other object to a connection object and resume communicating with the server without reestablishing a TCP/IP connection with the server.

A connection between a traffic manager and a server in a server array may become idle when it is no longer actively being used to transmit data. For example, in the example above where a client requests a WWW page, an mp3 file, and then a graphics image, when the client requests the mp3 file, the one or more of the network traffic management devices 112(A)-112(C) of the cluster may determine that the connection that was used to transmit the WWW page is no longer active.

The cloning module 210 contains computer readable instructions which, when executed by one or more processors 200, causes the processor 200 on the network device to perform the processes described in FIGS. 3 and 4. It should be noted that although the cloning module 210 is shown within the memory 212, it is contemplated that the cloning module 210 may be elsewhere inside or exterior to the network traffic management device 112. Details of the cloning module 210 are described below.

As stated above, the present disclosure is directed to a system and method for effectively reusing existing idle flow connections among network traffic management devices in a network traffic management cluster. In particular, the system and method utilizes the cloning modules 210 of the network traffic management devices 112 to generate a flow cookie which is inserted into a client request that is forwarded to the server. The server responses include the flow cookie information to allow proper routing, by a server side load balancer, of the response back to the correct network traffic management device, and effectively the requesting client. The present system and method allows subsequent client requests to be are handled by the cloning module 210 of the one or more other network traffic management devices in the cluster which reserve and reuse already established flow connections from a idle connection pool. To ensure that server responses to these subsequent requests are properly routed back to the other network traffic management device, the cloning module 210 retrieves the flow cookie of the previous flow connection and modifies to identify that network traffic management device as the sending device.

FIG. 3 illustrates a flow chart describing at least a portion of the cloning process in accordance with an aspect of the present disclosure. FIG. 4 illustrates a ladder diagram illustrating the process described in FIG. 3 in accordance with an aspect of the present disclosure. As shown in FIGS. 3 and 4, the process begins at the Block 300. A client request, such as a request to access a particular HTML page from a server, is received at a network traffic management cluster 110 (Block 302; Step 1). As stated above, the network traffic management cluster 110 comprises a plurality of network traffic management devices 112 along with one or more load balancers 214 which handle client side and/or server side disaggregation functions.

In particular to the example shown in FIG. 4, a client side load balancer 214 handles the incoming HTTP client request and performs a load balancing technique which results in it directing the request to a first network traffic management device 112A (Block 302; Step 2). The first network traffic management device 112A establishes a TCP flow connection, shown as flow connection "1" in Block 304, between the client 106 and the server 102.

In preparing the client request, the first network traffic management device 112A generates a flow cookie and inserts it into a portion of a HTTP, IPv6 or other header and/or the body of the client request to modify the client request (Block 306). As stated above, the flow cookie contains routing information which is used to accurately route any responses back to the source network traffic management device 112. In particular, to the present example in FIGS. 3 and 4, flow cookie "1" is inserted into the request by the cloning module 210 of the first network traffic management device 112A contains routing information, including but not limited to, source address and IP address of the first network traffic management device 112A and the like. The modified client request is then forwarded to the destination server 102 (Block 306, Step 3).

After the server has received and processed the modified client request, the server generates a server response which includes the routing information of the flow cookie "1" and sends it back to the network traffic management cluster 110 (Step 4). The network traffic management cluster 110 receives the server response having the flow cookie "1". A server side load balancer 214 handles the server response and routes the response to the first network traffic management device 112A based on the routing information in flow cookie "1" (Block 308, Step 5). The server response is then forwarded from the first network traffic management device 112A to the requesting client 106 (Block 308, Step 6).

The one or more network traffic management devices 112(A)-112(C) stores the connection "1" to idle connection pool, whereby the flow connection "1" will be available for the same or another network traffic management device 112 to use after it becomes idle and thus available (Block 310). The information stored in association with the flow connection in the idle pool includes, but is not limited to, client IP address, client port number, client packet sequence number, server IP address, server port number, and server packet sequence number. Adding the current connection to the idle connection pool makes it immediately available to another client request and thereby minimizes client waits that may arise due to insufficient available connections. Data representing an idle state is saved for the current flow connection when it is added to the idle connection pool.

As shown in FIG. 4, a second request sent from a client 106 is received at the network traffic management cluster 110 (Step 7). In particular, the client side load balancer 214 handles the incoming HTTP client request and performs a load balancing technique which results in it directing the request to a second network traffic management device 112B (Block 312; Step 8).

After receiving the client request, the second network traffic management device 112B determines if an existing connection exists and is available between the requesting client 106 and the destination server 102 (Block 314). If not, in one aspect, the second network traffic management device 112B can generate a new TCP flow connection "2" between the client 106 and the server 102 along with a flow cookie "2" representing the routing information between the second network traffic management device 112B and the server 102 for the flow connection "2" (Block 328). Alternatively, the second network device can delay the processing of the request until the busy connection frees up and goes idle.

In contrast, if the second network traffic management device 112B determines that an idle connection for flow connection "1" is available, it retrieves the flow cookie "1" from the first network traffic management device 112A and reserves the connection "1" which corresponds to the flow cookie "1" by marking it (Block 316, Step 9).

Thereafter, the second network traffic management device 112B modifies the flow cookie "1" by changing one or more values in the flow cookie to indicate that the source address is of the second network traffic management device 112B, instead of the first network traffic management device 112A (Block 318). The second network traffic management device 112B then inserts the modified flow cookie "1" into a portion of a header of the client request to modify the client request, whereby the modified flow cookie contains routing information which is used to accurately route any server responses back to the second network traffic management device 112B (Block 320). The modified client request is then forwarded to the destination server 102 (Block 320, Step 10).

After the server has received and processed the modified client request, the server generates a server response which includes the routing information of the flow cookie "1" and sends it back to the network traffic management cluster 110 (Step 11). The network traffic management cluster 110 receives the server response having the flow cookie "1" (Block 322), whereby the server side load balancer 214 handles the server response and routes the response to the second network traffic management device 112B based on the routing information in flow cookie "1" (Block 324, Step 12). The server response is then forwarded from the second network traffic management device 112B to the requesting client 106 (Block 326, Step 13). The process thereafter ends (Block 330).

After a network traffic management device has sent a client request to a server and received a complete response from the server, the TCP flow connection between the client device 106 and the server 102 are put in a Connection Reuse Pool or Idle Pool. When new clients create new TCP connections to the network traffic management device, instead of creating new TCP connections to the servers, the network traffic management device may pick am existing connection from the idle pool.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks using different types of traffic management devices may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order. It should be noted that although the above description refers to a first and second network traffic management device, additional network traffic management devices are contemplated (e.g. third network traffic management device, fourth network traffic management device, etc.). It should also be noted that the above example refers to the network traffic management devices as first and second for explanation purposes and can be swapped (i.e. second network traffic management device previously handled the established flow connection, whereby the first network traffic management device reserves the flow connection and retrieves the flow cookie from the second network traffic management device).

What is claimed is:

1. A method for optimizing use of idle server connections, the method comprising:
    receiving, by a first network traffic management device of a plurality of network traffic management devices in a cluster, a request from a client device to access a server;
    reserving, by the first network traffic management device, an idle flow connection from an idle connection pool that was previously established between at least a second network traffic management device and the server;
    retrieving, by the first network traffic management device, a flow cookie from the second network traffic management device, wherein the flow cookie comprises routing information associated with the retrieved idle flow connection;
    modifying, by the first network traffic management device, the flow cookie, wherein the routing information in the flow cookie for the retrieved idle flow connection is updated to be between the server and the first network traffic management device;
    incorporating, by the first network traffic management device, the updated flow cookie into the received request to modify the request and forwarding the modified request to the server, wherein a response from the server contains the updated flow cookie such that the response is to be received by the first network traffic management device.

2. The method of claim 1, wherein the first network traffic management device receives the response based on the updated flow cookie.

3. The method of claim 2, wherein the first network traffic management device receives the request and the response routed from a disaggregator.

4. The method of claim 1, wherein the flow cookie is updated, by the first network traffic management device, by changing one or more values in the retrieved flow cookie.

5. The method of claim 1, wherein the flow cookie is incorporated in an IPv6 header of the request and the response or an HTTP header of the request and the response.

6. The method of claim 1, further comprising:
registering, by the first network traffic management device, a forwarding entry at the second network traffic management device, wherein the forwarding entry automatically causes packets sent to the second network traffic management device to be sent to the first network traffic management device.

7. The method of claim 1, wherein the flow cookie is incorporated in a body of the request and the response.

8. A non-transitory machine readable medium having stored thereon instructions for optimizing use of idle server connections, comprising machine executable code which when executed by at least one processor, causes the processor to perform step comprising:
receiving a request at a first traffic management device of a plurality of network traffic management devices in a cluster from a client device to access a server;
reserving an idle flow connection from an idle connection pool that was previously established between at least a second network traffic management device and the server;
retrieving a flow cookie from the second network traffic management device at the first network traffic management device, wherein the flow cookie comprises routing information associated with the retrieved idle flow connection;
modifying the flow cookie at the first network traffic management device, wherein the routing information in the flow cookie for the retrieved idle flow connection is updated to be between the server and a first network traffic management device;
incorporating the updated flow cookie into the received request to modify the request and forwarding the modified request to the server, wherein a response from the server contains the updated flow cookie such that the response is to be received by the first network traffic management device.

9. The medium of claim 8 wherein the first network traffic management device receives the response based on the updated flow cookie.

10. The medium of claim 9 the first network traffic management device receives the request and the response from a disaggregator module.

11. The medium of claim 8 wherein the flow cookie is updated by changing one or more values in the retrieved flow cookie.

12. The medium of claim 8 wherein the flow cookie is incorporated in an IPv6 header of the request and the response or an HTTP header of the request and the response.

13. The medium of claim 8 further having stored thereon instructions that when executed by the processor cause the processor to perform steps further comprising:
registering a forwarding entry at the second network traffic management device, wherein the forwarding entry automatically causes packets sent to the second network traffic management device to be sent to the first network traffic management device.

14. The medium of claim 8 wherein the flow cookie is incorporated in a body of the request and the response.

15. A first network traffic management device comprising:
at least one of configurable hardware logic configured to implement or one or more processors configured to be capable of executing programmed instructions comprising and stored in the memory to:
receive a request from a client device to access a server;
reserve an idle flow connection from an idle connection pool that was previously established between at least a second network traffic management device and the server;
retrieve a flow cookie from the second network traffic management device, wherein the flow cookie comprises routing information associated with the retrieved idle flow connection;
modify the flow cookie, wherein the routing information in the flow cookie for the retrieved idle flow connection is updated to be between the server and the first network traffic management device;
incorporate the updated flow cookie into the received request to modify the request and forwarding the modified request to the server, wherein a response from the server contains the updated flow cookie such that the response is to be received by the first network traffic management device.

16. The device of claim 15, wherein the first network traffic management device receives the request and the response from a disaggregator module.

17. The device of claim 15, wherein the flow cookie is updated by changing one or more values in the retrieved flow cookie.

18. The device of claim 15, wherein the flow cookie is incorporated in an IPv6 header of the request and the response or an HTTP header of the request and the response.

19. The device of claim 15 wherein the at least one of the configurable hardware logic is further configured to implement or the one or more processors are further configured to be capable of executing programmed instructions comprising and stored in the memory to:
register a forwarding entry at the second network traffic management device, wherein the forwarding entry automatically causes packets sent to the second network traffic management device to be sent to the first network traffic management device.

20. The device of claim 15, wherein the flow cookie is incorporated in a body of the request and the response.

21. The method of claim 15, wherein the at least one of the configurable hardware logic is further configured to implement or the one or more processors is further configured to be capable of executing programmed instructions comprising and stored in the memory to: receive the response based on the updated flow cookie.

* * * * *